(12) United States Patent
Shi

(10) Patent No.: US 8,704,970 B2
(45) Date of Patent: Apr. 22, 2014

(54) LIQUID CRYSTAL MODULE AND LIQUID CRYSTAL DISPLAY

(75) Inventor: Qinjun Shi, Shenzhen (CN)

(73) Assignee: Shenzhen China Star Optoelectronics Technology Co., Ltd., Shenzhen (CN)

(*) Notice: Subject to any disclaimer, the term of this patent is extended or adjusted under 35 U.S.C. 154(b) by 200 days.

(21) Appl. No.: 13/379,662

(22) PCT Filed: Aug. 8, 2011

(86) PCT No.: PCT/CN2011/078121
§ 371 (c)(1),
(2), (4) Date: Dec. 21, 2011

(87) PCT Pub. No.: WO2013/007047
PCT Pub. Date: Jan. 17, 2013

(65) Prior Publication Data
US 2013/0010225 A1    Jan. 10, 2013

(30) Foreign Application Priority Data
Jul. 8, 2011    (CN) ...................... 2011 2 0239950 U

(51) Int. Cl.
*G02F 1/1333*    (2006.01)
(52) U.S. Cl.
USPC ............................................. 349/58; 361/829
(58) Field of Classification Search
CPC .................................................. G02F 1/1313
USPC .......................................... 349/58; 361/829
See application file for complete search history.

(56) References Cited

U.S. PATENT DOCUMENTS

| 6,671,012 B1* | 12/2003 | Tanaka | 349/58 |
| 7,050,128 B2* | 5/2006 | Lee et al. | 349/58 |
| 7,916,240 B2* | 3/2011 | Huang et al. | 349/60 |
| 2007/0115401 A1* | 5/2007 | Tsubokura et al. | 349/58 |
| 2007/0268679 A1* | 11/2007 | Kao | 361/800 |
| 2008/0100770 A1* | 5/2008 | Chen et al. | 349/58 |
| 2010/0073594 A1* | 3/2010 | Miyazaki | 349/58 |

FOREIGN PATENT DOCUMENTS

| CN | 200983055 Y | 11/2007 |
| CN | 201637970 U | 11/2010 |

OTHER PUBLICATIONS

International Search Report of the PCT Application No. PCT/CN2011/078121.

* cited by examiner

*Primary Examiner* — Edward Glick
*Assistant Examiner* — Sang V Nguyen

(57) ABSTRACT

The present disclosure discloses a liquid crystal module and a liquid crystal display. The liquid crystal module includes a plastic frame, a front frame as well as a liquid crystal display panel positioned therebetween. The front frame is a square frame made of a sheet formed by vacuum molding. The front frame and the plastic frame are cooperated with each other in order to fix the liquid crystal display panel. The front frame includes an elastic buckling part/elastic clamping buckle, and the plastic frame includes a clamping buckle/buckling part being interference fit with the elastic buckling part/elastic clamping buckle for fixing the liquid crystal display panel. The front frame of the present disclosure, shortens the developing period so as to reduce the cost for opening module of the liquid crystal module and further reduce the manufacturing cost of the liquid crystal display.

16 Claims, 2 Drawing Sheets

LIQUID CRYSTAL MODULE AND LIQUID CRYSTAL DISPLAY

BACKGROUND

1. Technical Field

The present disclosure relates to the technical field of liquid crystal display, particularly to a liquid crystal module and a liquid crystal display.

2. Description of Related Art

In most of the liquid crystal modules of the prior art, the liquid crystal display panel is fixed by assembling a front frame and a plastic frame. As is shown in FIG. 1, which is the schematic perspective exploded view of the liquid crystal module of the prior art. At present, a front frame 4 of the liquid crystal module 1 generally refers to a frame structure that is made of steel products by impact molding. The front frame 4 is fixed on the plastic frame 2 by screws cooperating with screw holes 5 of the front frame 4 so as to fix the liquid crystal display panel 3. For example, the front frame 4 is iron frame, and etc.

However, the existing metal front frames, which are made from irons etc, have the following defects:

1. Manufacturing the front frame consumes large quantity of steel products; as a result, the cost is increased;
2. Since the front frame and the mould need to be designed respectively while developing each liquid crystal module, it increases the developing period of the liquid crystal module with higher cost;
3. The front frame formed by impact molding of the steel products is larger in volume and heavier in weight, which is not beneficial for the light and thin design of the liquid crystal module.

SUMMARY

The main purpose of the present disclosure is to provide a liquid crystal module and a liquid crystal display, which aims at simplifying the structural design of the front frame and saves the production cost.

In order to achieve the above-mentioned purposes, the present disclosure discloses a liquid crystal module, including a plastic frame and a front frame as well as a liquid crystal display panel positioned between the plastic frame and the front frame. Said front frame is a square frame made of a sheet formed by vacuum molding, said front frame and said plastic frame are buckled with each other in order to fix said liquid crystal display panel. Said front frame includes two side frame parts faced to each other as well as a top frame part and a bottom frame part for connecting said two side frame parts. Said side frame parts, said top frame part and said bottom frame part are respectively composed of multiple segmented strip supporting rods.

Preferably, said front frame is provided with an elastic buckling part; a position of said plastic frame corresponding to said elastic buckling part is provided with a clamping buckle, and said clamping buckle is in interference fit with said elastic buckling part; or said front frame is provided with an elastic clamping buckle; a position of said plastic frame corresponding to said elastic clamping buckle is provided with a buckling part, and said elastic clamping buckle is in interference fit with said buckling part.

Preferably, the side frame part, the top frame part and the bottom frame part of said front frame are all provided with elastic clamping buckles; and positions of said plastic frame corresponding to said elastic clamping buckles are provided with a buckling part.

Preferably, partial positions of the side frame part, the top frame part and the bottom frame part of said front frame are provided with elastic clamping buckles and partial positions thereof are provided with elastic buckling parts. The corresponding positions of said plastic frame are provided with buckling parts that are in interference fit with the clamping buckles of the front frame or are interference fit with the buckling parts of the front frame. And the front frame can be fixed on the plastic frame by interference fitting the clamping buckles with the buckling parts.

Preferably, said strip supporting rod is arranged on a folded corner of the front frame.

Preferably, said multiple segmented strip supporting rods which constitute said side frame part, said top frame part and said bottom frame part are mutually distributed at equal intervals.

Preferably, said clamping buckle is a hollow bulge, and said buckling part is a pit that is matched with said hollow bulge.

Preferably, the shape of the cross section of said clamping buckle is a circle, a square or a rectangle with a circular bead.

The present disclosure also discloses a liquid crystal model, including a plastic frame and a front frame as well as a liquid crystal display panel that is positioned between the plastic frame and the front frame, wherein said front frame is a square frame made of a sheet formed by vacuum molding; said front frame and said plastic frame are buckled with each other in order to fix said liquid crystal display panel.

Preferably, said front frame is provided with an elastic buckling part; a position of said plastic frame corresponding to said elastic buckling part is provided with a clamping buckle, and said clamping buckle is in interference fit with said elastic buckling part.

Preferably, said front frame is provided with an elastic clamping buckle; a position of said plastic frame corresponding to said elastic clamping buckle is provided with a buckling part, and said elastic clamping buckle is in interference fit with said buckling part.

Preferably, said front frame includes two side frame parts faced to each other as well as a top frame part and a bottom frame part for connecting said two side frame parts; said side frame parts, said top frame part and said bottom frame part are respectively composed of integrally-molded strip supporting rods.

Preferably, the side frame part, the top frame part and the bottom frame part of said front frame are all provided with elastic clamping buckles; and positions of said plastic frame corresponding to said elastic clamping buckles are provided with buckling parts.

Preferably, partial positions of the side frame part, the top frame part and the bottom frame part of said front frame are provided with elastic clamping buckles and partial positions thereof are provided with elastic buckling parts. The corresponding positions of said plastic frame are provided with buckling parts that are in interference fit with the clamping buckles of the front frame or are interference fit with the buckling parts of the front frame; and the front frame can be fixed on the plastic frame by interference fitting the clamping buckles with the buckling parts.

Preferably, said clamping buckle is a hollow bulge, and said buckling part is a pit that is matched with said hollow bulge.

Preferably, the shape of the cross section of said clamping buckle is a circle, a square or a rectangle with a circular bead.

The present disclosure further discloses a liquid crystal display, including a backlight module and a liquid crystal module, said liquid crystal module includes a plastic frame and a front frame as well as a liquid crystal display panel that is positioned between said plastic frame and said front frame; said front frame is a square frame made of a sheet formed by vacuum molding; said front frame and said plastic frame are buckled with each other in order to fix said liquid crystal display panel.

Preferably, said front frame is provided with an elastic buckling part; a position of said plastic frame corresponding to said elastic buckling part is provided with a clamping buckle, and said clamping buckle is in interference fit with said elastic buckling part; or said front frame is provided with an elastic clamping buckle; a position of said plastic frame corresponding to said elastic clamping buckle is provided with a buckling part, and said elastic clamping buckle is in interference fit with said buckling part.

Preferably, said front frame includes two side frame parts faced to each other as well as a top frame part and a bottom frame part for connecting said two side frame parts; said side frame parts, said top frame part and said bottom frame part are respectively composed of integrally-molded strip supporting rods.

Preferably, said front frame includes two side frame parts faced to each other as well as a top frame part and a bottom frame part for connecting said two side frame parts; said side frame parts, said top frame part and said bottom frame part are respectively composed of multiple segmented strip supporting rods.

In the liquid crystal module and the liquid crystal display of the present disclosure, the front frame is made of the sheet formed by vacuum molding. Meanwhile, the front frame includes an elastic buckling part/elastic clamping buckle, and the plastic frame includes a clamping buckle/buckling part being interference fit with the elastic buckling part/elastic clamping buckle for fixing the liquid crystal display panel. The present disclosure simplifies the design of the front frame, shortens the developing period so as to reduce the cost for opening module of the liquid crystal module and further reduce the manufacturing cost of the liquid crystal display.

The purpose implementation, the function features and advantages of the invention will be further illustrated by integrating the exemplary embodiments and taking the attached drawings as references.

DETAILED DESCRIPTION

The technical methods for realizing the purposes of the invention will be illustrated in details by integrating the attached drawings and the embodiments. It should be understood that the described exemplary embodiments are only used for illustrating this invention rather than limiting.

The main concept of the present disclosure is to fix the liquid crystal display panel that is positioned between a plastic frame and a front frame made of a sheet formed by vacuum molding and with an elastic buckling part that is in interference fit with the buckling part at the corresponding part of the plastic frame, or a clamping buckle that is in interference fit with the buckling part at the corresponding part of the plastic frame, so as to reduce the design cost for module of the liquid crystal module and further reduce the manufacturing cost of the liquid crystal display.

Figure 1:
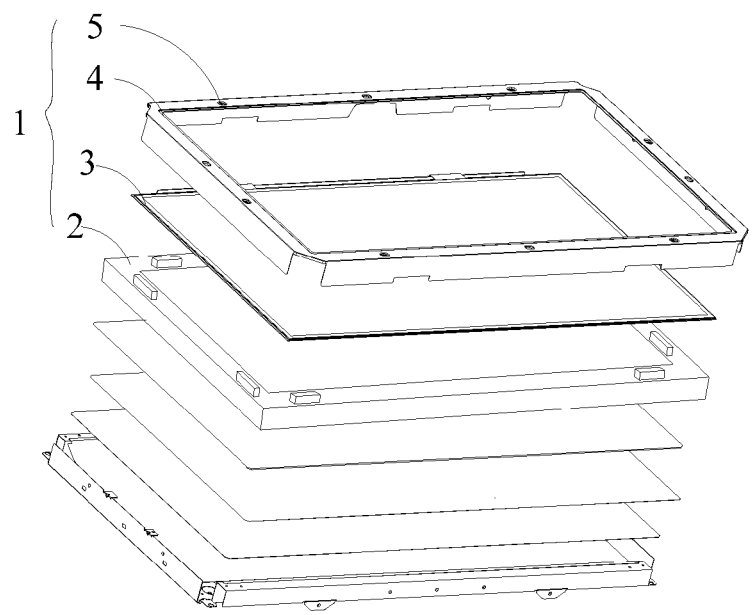
FIG. 1 is a schematic perspective exploded view of the liquid crystal module of the prior art.
Figure 2:
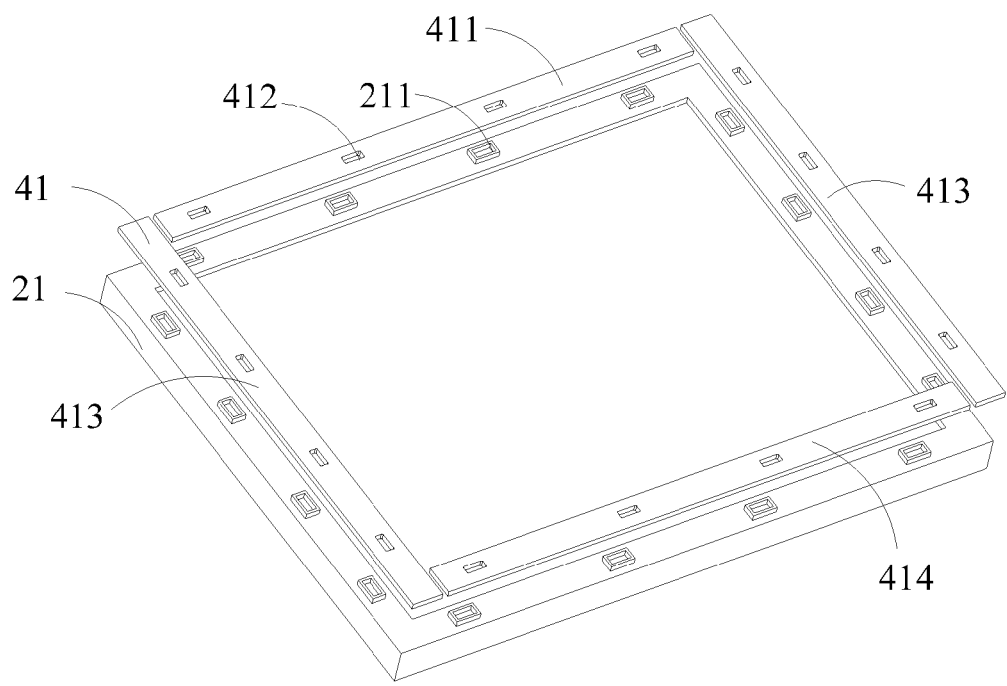
FIG. 2 is a schematic perspective exploded view of the liquid crystal module according to a first embodiment of the present disclosure.

Please take FIG. 2 as a reference, the liquid crystal module according to a first embodiment of the present disclosure includes a frame-shaped plastic frame 21, a front frame 41 and a liquid crystal display panel (not shown) that is positioned between the plastic frame 21 and the front frame 41. Said front frame 41 is a square frame made of a sheet formed by vacuum molding, said front frame 41 and said plastic frame 21 are buckled with each other in order to fix said liquid crystal display panel.

Specifically, the front frame 41 is made of a conductive sheet formed by vacuum molding, which is a thermal molding method for thermoplastic plastic. After being clamped on a frame of the vacuum molding machine tightly, slice-shaped or sheet-shaped materials are softened by heat then are sucked onto surfaces of the modules through vacuum air channel defined in the edge of the module; after a short cooling time, the formed products such as the concave-convex shaped plastic products etc. are obtained. The device for the vacuum molding is simple, with which the mould does not need to bear the pressure and the mould can be made from metals, woods or plasters. Therefore, the device has the advantages of fast forming speed and easy operation etc.

In this embodiment, the front frame 41 includes four side frames, specifically includes two side frame parts 413 faced to each other as well as a top frame part 411 and a bottom frame part 414 connecting said two side frame parts 413. The side frame parts 413, the top frame part 411 and the bottom frame part 414 are respectively composed of integrally-molding strip supporting rods. The side frame part 413, the top frame part 411 and the bottom frame part 414 are respectively provided with elastic buckling parts 412 which are formed by vacuum molding. A position of the plastic frame 21 corresponding to said elastic buckling parts 412 is provided with a clamping buckle 211, wherein said clamping buckle 211 is a hollow bulge and said elastic buckling part 412 is the pit matched with the hollow bulge of said clamping buckle 211. With the elastic deformation of the elastic buckling part 412, the clamping buckle 211 can be in interference fit with the elastic buckling part 412 so that the front frame 41 can be fixed on the plastic frame 21, and the liquid crystal display panel can be fixed between the front frame 41 and the plastic frame 21.

Further, the shapes of the clamping buckle 211 and the elastic buckling part 412 can be a circle, a square or a rectangle with circular bead or other similar shapes. The clamping buckle 211 arranged on the side frame of the plastic frame 21 in this embodiment is a rectangular hollow bulge, and the buckling part 412 arranged on the side frame 411 of the front frame 41 is a rectangle with a circular bead.

Further, the distribution density of the elastic buckling part 412 disposed on the side frame part 413, the top frame part 411 and the bottom frame part 414 can be specifically set according to the widths and the required fastening degree of the side frame part 413, the top frame part 411 and the bottom frame part 414. In other embodiments, the elastic buckling part 412 can be only arranged on partial side frame of the front frame 41 according to the required fastening degrees or other practical situations, for example, the elastic buckling parts 412 are only arranged on the two side frame parts 413 of the front frame 41.

As described above, the front frame 41 can be closely fitted with the plastic frame 21, moreover, since the front frame 41 is formed by vacuum molding, thus reduce the cost for developing the mould of the front frame 41 and avoid the defects of larger volume, heavier weight of the front frame, and unbeneficial for light-thin design of the liquid crystal module due to the traditional impact molding of steel products.

Figure 3:
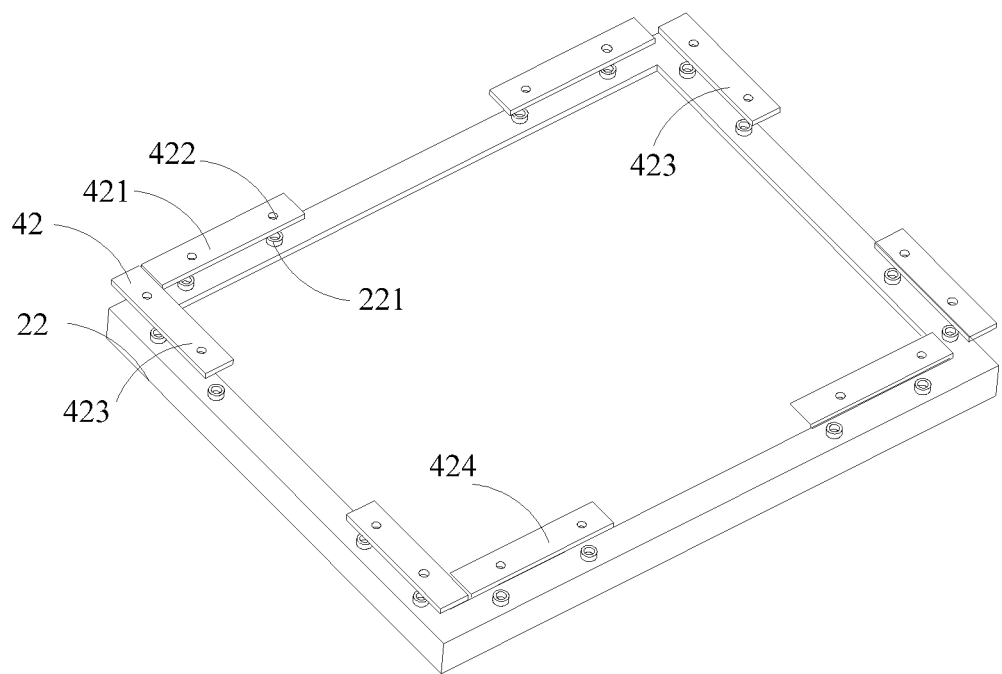
FIG. 3 is a schematic perspective exploded view of the liquid crystal module according to a second embodiment of the present disclosure.

Please take FIG. 3 as a reference, which is a schematic perspective exploded view of the liquid crystal module according to a second embodiment of the present disclosure. A structure of a front-frame of a liquid crystal module according to the second embodiment of the present disclosure is similar with that of said first embodiment; however, the difference between them lies in that in this embodiment the side frame part 423, the top frame part 421 and the bottom frame part 424 of the front frame 42 are composed of multiple segmented strip supporting rods. As is shown in FIG. 3, in this embodiment, the strip supporting rods are arranged at the folded corner of the front frame 42.

In addition, the clamping buckle 221 arranged on the plastic frame 22 in this embodiment is cylinder-shaped; correspondingly, the elastic buckling part 422 arranged on the front frame 42 is the circular hole which is in interference fit with the clamping buckle 221 of the plastic frame 22.

It should be illustrated, in other embodiments, multiple segmented strip supporting rods which constitute the side frame part 423, the top frame part 421 and the bottom frame part 424 of the front frame 42 can be equally intervals.

In other embodiments, the elastic clamping buckles can be also arranged on the side frame parts 413,423, the top frame parts 411, 421 and the bottom frame parts 414, 424 of the front frames 41, 42; the positions of the plastic frames 21, 22 corresponding to the elastic clamping buckles are provided with buckling parts; and the front frames 41, 42 can be fixed with the plastic frames 21, 22 through the interference fit between the elastic clamping buckle and the buckling part. Or, the elastic clamping buckles are arranged on partial positions of the side frame parts 413, 423, the top frame parts 411, 421 and the bottom frame parts 414, 424 of the front frames 41, 42, and partial positions thereof are provided with elastic buckling parts; while the corresponding parts of the plastic frame 21, 22 are provided with buckling parts which are in interference fit with the clamping buckles of the front frames 41, 42, and clamping buckles which are in interference fit with the buckling parts on the front frames 41, 42. Through the interference fit between the relative clamping buckles and the buckling parts, the front frames 41, 42 can be fixed with the plastic frames 21, 22, so that the liquid crystal display panel can be fixed between the front frames 41, 42 and the plastic frames 21,22.

Moreover, in other embodiments, the side frame parts 413 and 423 of the front frames 41, 42 can be also composed of integrally-molded strip supporting rods; the top frame parts 411, 421 and the bottom frame parts 414, 424 are composed of multiple segmented strip supporting rods. Alternatively, the two adjacent side frames can be composed of integrally-molded strip supporting rods, and the other two adjacent side frames are respectively compose of multiple segmented strip supporting rods. For example, the side frame parts 413, 423 and the top frame parts 411, 421 on one side of the front frame 41, 42 are respectively composed of integrally-molded strip supporting rods, while the side frame parts 413, 423 and the bottom frame parts 414, 424 of the front frames 41, 42 are respectively composed of multiple segmented strip supporting rods.

More specifically, the present disclosure further discloses a liquid crystal display, which includes a backlight module and said liquid crystal module. Here would not illustrate the liquid crystal display in details.

In the liquid crystal module and the liquid crystal display of the present disclosure, the front frame is made of a conductive sheet formed by vacuum molding. Meanwhile, the front frame includes an elastic buckling part/elastic clamping buckle, and the plastic frame includes a clamping buckle/buckling part being interference fit respectively for fixing the liquid crystal display panel. In the process of vacuum molding, the side frame of the front frame can be set into a single-sided whole strip or can be arranged into a segmented, which simplifies the design of the front frame, shortens the developing period so as to reduce the cost for opening module of the liquid crystal module and further reduce the manufacturing cost of the liquid crystal display; moreover, the purpose of the liquid crystal module with light weight and thinness can be achieved.

What illustrated above are just preferable exemplary embodiments, which will not limit the patent scope of the invention. Any equivalent structure replacements or flow replacements which are made by the specifications and drawings of the invention, or are directly or indirectly applied to other technical fields, should be included into the protection scope of the patent of the invention.

What is claimed is:

1. A liquid crystal module, comprising a plastic frame and a front frame as well as a liquid crystal display panel positioned between the plastic frame and the front frame, wherein said front frame is a square frame made of a sheet formed by vacuum molding; said front frame and said plastic frame are buckled with each other in order to fix said liquid crystal display panel; said front frame comprises two side frame parts faced to each other as well as a top frame part and a bottom frame part for connecting said two side frame parts; said side frame parts, said top frame part and said bottom frame part are respectively composed of multiple segmented strip supporting rods; said multiple segmented strip supporting rods which constitute said side frame part, said top frame part and said bottom frame part are mutually distributed at equal intervals.

2. The liquid crystal module according to claim 1, wherein said front frame is provided with an elastic buckling part; a position of said plastic frame corresponding to said elastic buckling part is provided with a clamping buckle, and said clamping buckle is in interference fit with said elastic buckling part; or said front frame is provided with an elastic clamping buckle; a position of said plastic frame corresponding to said elastic clamping buckle is provided with a buckling part, and said elastic clamping buckle is in interference fit with said buckling part.

3. The liquid crystal module according to claim 2, wherein the side frame part, the top frame part and the bottom frame part of said front frame are all provided with elastic clamping buckles; and positions of said plastic frame corresponding to said elastic clamping buckles are provided with a buckling part.

4. The liquid crystal module according to claim 2, wherein partial positions of the side frame part, the top frame part and the bottom frame part of said front frame are provided with elastic clamping buckles and partial positions thereof are provided with elastic buckling parts; the corresponding positions of said plastic frame are provided with a buckling parts that are in interference fit with the clamping buckles of the front frame or is interference fit with the buckling parts of the front frame; and the front frame can be fixed with the plastic frame by interference fitting the clamping buckles with the buckling parts.

5. The liquid crystal module according to claim 2, wherein said strip supporting rod is arranged on a folded corner of the front frame.

6. The liquid crystal module according to claim 1, wherein said clamping buckle is a hollow bulge, and said buckling part is a pit that is matched with said hollow bulge.

7. The liquid crystal module according to claim 6, wherein the shape of the cross section of said clamping buckle is a circle, a square or a rectangle with a circular bead.

8. A liquid crystal module, comprising a plastic frame and a front frame as well as a liquid crystal display panel positioned between the plastic frame and the front frame, wherein said front frame is a square frame made of a sheet formed by vacuum molding; said front frame and said plastic frame are buckled with each other in order to fix said liquid crystal display panel; said front frame comprises two side frame parts faced to each other as well as a top frame part and a bottom frame part for connecting said two side frame parts; said side frame parts, said top frame part and said bottom frame part are respectively composed of multiple segmented strip supporting rods; said multiple segmented strip supporting rods which constitute said side frame part, said top frame part and said bottom frame part are mutually distributed at equal intervals.

9. The liquid crystal module according to claim 8, wherein said front frame is provided with an elastic buckling part; a position of said plastic frame corresponding to said elastic buckling part is provided with a clamping buckle, and said clamping buckle is in interference fit with said elastic buckling part.

10. The liquid crystal module according to claim 9, wherein said front frame is provided with an elastic clamping buckle; a position of said plastic frame corresponding to said elastic clamping buckle is provided with a buckling part, and said elastic clamping buckle is in interference fit with said buckling part.

11. The liquid crystal module according to claim 8, wherein the side frame part, the top frame part and the bottom frame part of said front frame are all provided with elastic clamping buckles; and positions of said plastic frame corresponding to said elastic clamping buckles are provided with buckling parts.

12. The liquid crystal module according to claim 8, wherein partial positions of the side frame part, the top frame part and the bottom frame part of said front frame are provided with elastic clamping buckles and partial positions thereof are provided with elastic buckling parts; the corresponding positions of said plastic frame are provided with buckling parts that are in interference fit with the clamping buckles of the front frame or are interference fit with the buckling parts of the front frame; and the front frame can be fixed with the plastic frame by interference fitting the clamping buckles with the buckling parts.

13. The liquid crystal module according to claim 8, wherein said clamping buckle is a hollow bulge, and said buckling part is a pit that is matched with said hollow bulge.

14. The liquid crystal module according to claim 13, wherein the shape of the cross section of said clamping buckle is a circle, a square or a rectangle with a circular bead.

15. A liquid crystal display, comprising a backlight module and a liquid crystal module, wherein said liquid crystal module comprises a plastic frame and a front frame as well as a liquid crystal display panel positioned between said plastic frame and said front frame; said front frame is a square frame made of a sheet formed by vacuum molding; said front frame and said plastic frame are buckled with each other in order to fix said liquid crystal display panel; said front frame comprises two side frame parts faced to each other as well as a top frame part and a bottom frame part for connecting said two side frame parts; said side frame parts, said top frame part and said bottom frame part are respectively composed of multiple segmented strip supporting rods; said multiple segmented strip supporting rods which constitute said side frame part, said top frame part and said bottom frame part are mutually distributed at equal intervals.

16. The liquid crystal display according to claim 15, wherein said front frame is provided with an elastic buckling part; a position of said plastic frame corresponding to said elastic buckling part is provided with a clamping buckle, and said clamping buckle is in interference fit with said elastic buckling part; or said front frame is provided with an elastic clamping buckle; a position of said plastic frame corresponding to said elastic clamping buckle is provided with a buckling part, and said elastic clamping buckle is in interference fit with said buckling part.

\* \* \* \* \*